March 12, 1963  J. R. DISON ET AL  3,081,097

SHAFT SEAL

Filed Nov. 27, 1959

INVENTORS
James R. Dison,
Wylie L. Johnson III, &
BY William F. Jones
Robert E. McCollum
ATTORNEY

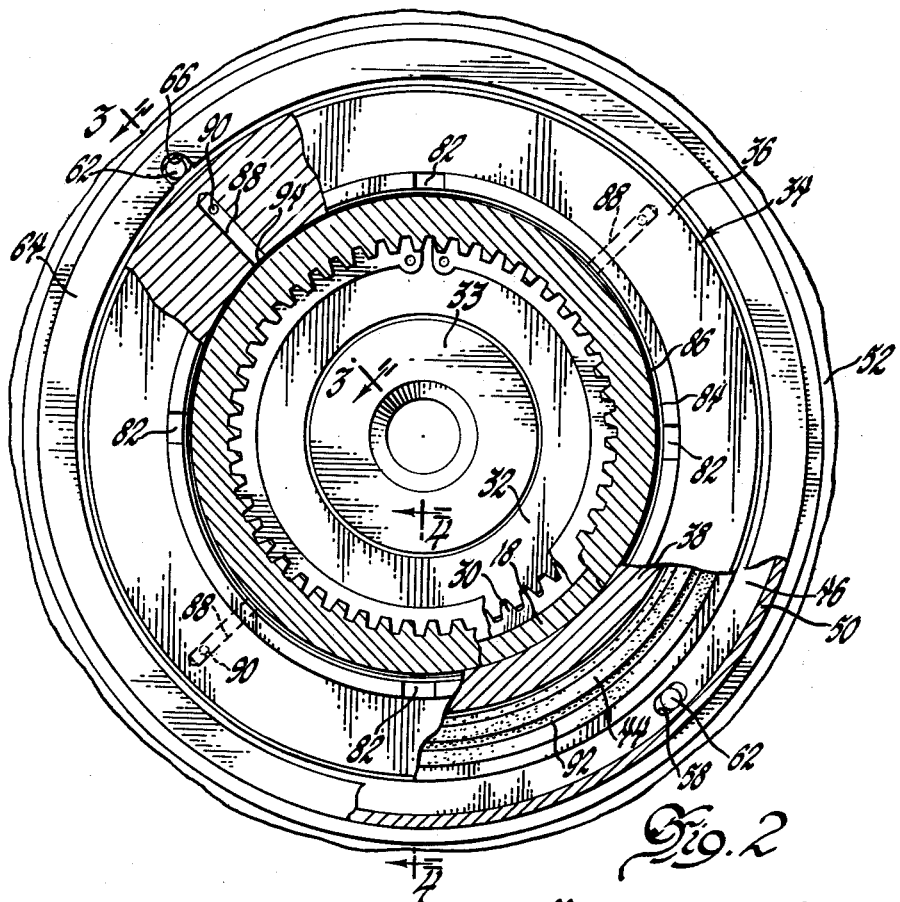
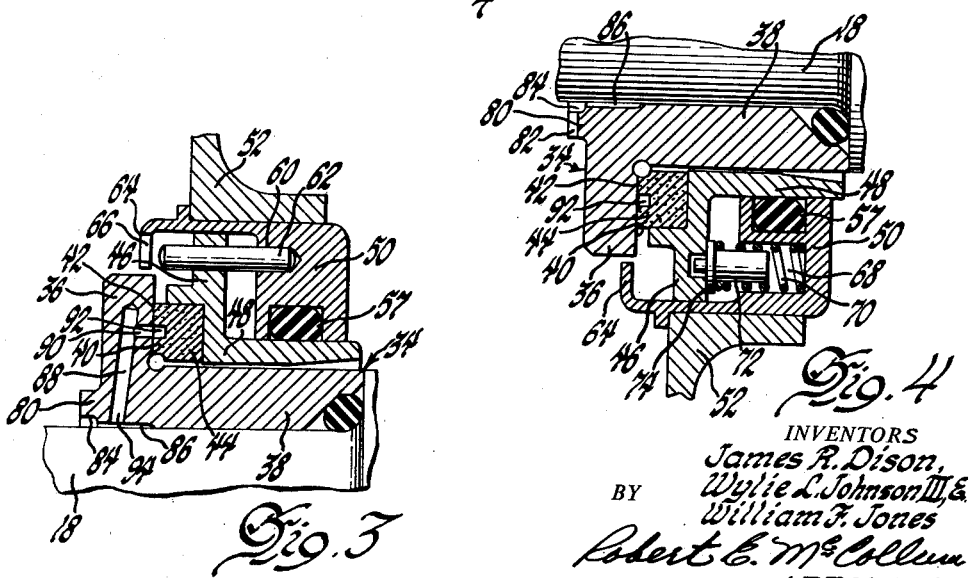
Fig. 2
Fig. 3
Fig. 4
INVENTORS
James R. Dison,
Wylie L. Johnson III, &
William F. Jones
BY Robert E. McCollum
ATTORNEY

United States Patent Office 3,081,097
Patented Mar. 12, 1963

3,081,097
SHAFT SEAL
James R. Dison, Pittsboro, and Wylie L. Johnson III and William F. Jones, Indianapolis, Ind., assignors to General Motors Corporation, Detroit, Mich., a corporation of Delaware
Filed Nov. 27, 1959, Ser. No. 855,640
7 Claims. (Cl. 277—23)

This invention relates to a shaft seal.

More particularly, this invention relates to a shaft seal for the rotor assembly of an axial flow type compressor or turbine, for example, wherein it is desired to prevent the communication of bearing lubricating oil into the rotor stages.

Therefore, it is an object of the invention to provide a shaft seal for a rotatable assembly to prevent the communication of bearing lubricant to other sections of the assembly.

In many multi-stage axial flow compressor installations, a pressure rise across the oil seal between the bearing and initial rotor stages causes oil to leak through the seal and become mixed with the air in the rotor stages, where it would form deposits, foul other seals, etc. This invention eliminates such a condition by providing seal means of the sliding contact face type having a face pressurized at a pressure higher than the pressure of any fluid in the area adjacent the seal creating a pressure differential therebetween, thereby preventing a leak of contaminating fluid across the seal.

Therefore, it is an object of the invention to provide a pressurized shaft seal of the sliding contact face type preventing flow of undesirable fluid across the face.

Other objects, advantages and features will become apparent upon reference to the succeeding detailed description of the invention illustrating the preferred embodiment of the invention, wherein:

FIGURE 2 is a front cross-sectional view taken on a plane indicated by and viewed in the direction of the arrows 2—2 of FIGURE 1;

FIGURE 3 is an enlarged cross-sectional view of a detail of FIGURE 1 taken on a plane indicated by and viewed in the direction of the arrows 3—3 of FIGURE 2, and FIGURE 4 is an enlarged cross-sectional view of another detail of FIGURE 1 taken on a plane indicated by and viewed in the direction of the arrows 4—4 of FIGURE 2.

Figure 1:
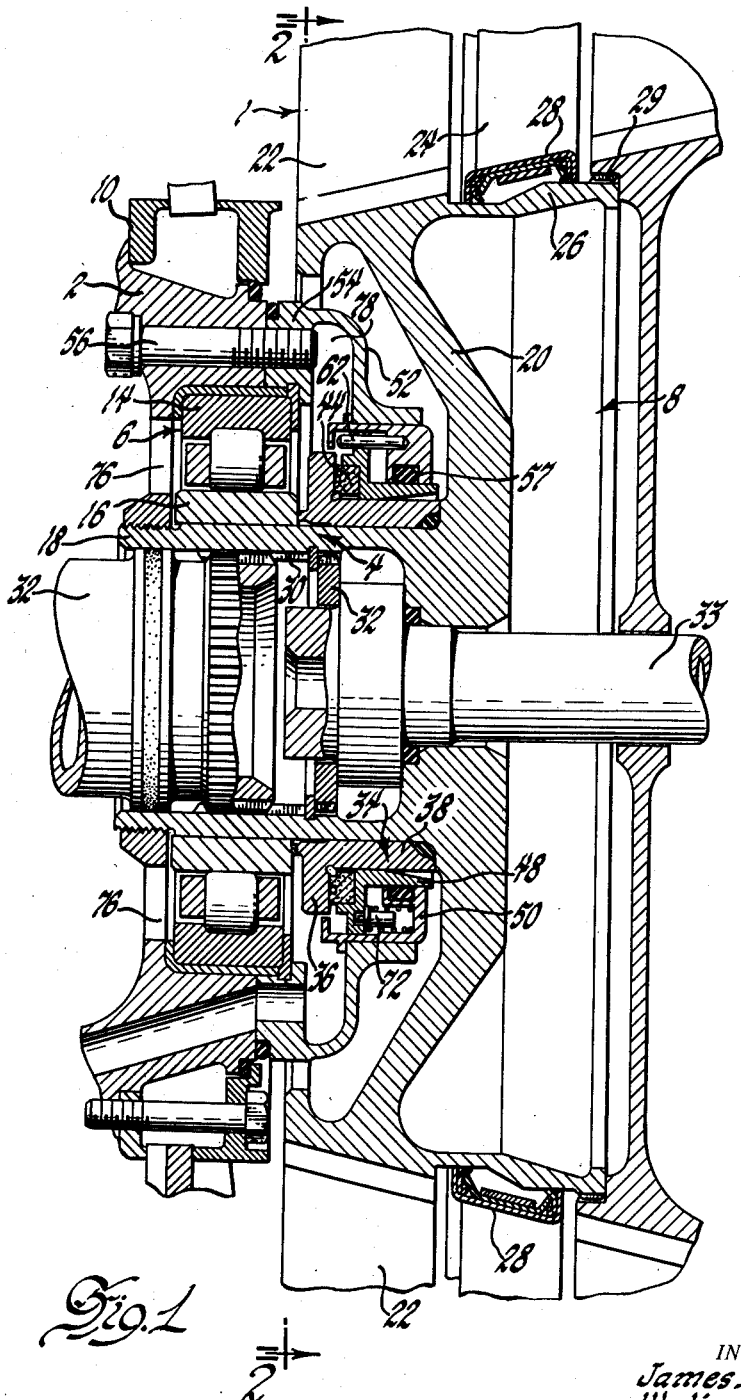
FIGURE 1 is a longitudinal cross-sectional view of a portion of a compressor embodying the invention.

Referring to the drawings and more particularly to FIGURE 1, there is illustrated therein the initial stages of a multi-stage axial flow type compressor 1, although the invention could be as effectively illustrated in connection with a turbine or similar rotating apparatus wherein it is desired to provide a shaft seal between a rotating and stationary mechanism of the character to be described. Broadly, the compressor 1 comprises a stationary housing 2 connected to the compressor casing (not shown) and supporting a rotatable stub shaft 4 for relative rotation by means of a bearing 6 in a manner similar to that shown in U.S. 2,800,273, the shaft being an extension of the hub of the first stage of an axial flow multi-staged rotor 8.

Secured to the stationary supporting housing 2 is a compressor inlet guide vane structure 10 (only partially shown). Fixed within the housing 2 is the annular bearing means 6 having an outer radial race 14 secured in the housing, and an inner race 16 fixedly secured to the extended hub 18 of the first stage wheel 20 of the rotor 8 for relative rotation with respect to the housing. The wheel 20 has an annular set of rotor blades 22 suitably mounted at its periphery as shown and spaced equally around the circumference thereof for cooperation with an annular set of similarly circumferentially spaced stator vanes 24 secured to the compressor casing, the periphery of the wheel having an axially extending annular flange 26 providing a stator vane shroud ring and rotating seal portion cooperating with the inner radial hat-shaped stator seal members 28. Flange 26 and the adjacent wheel are splined as shown at 29 to provide a driving connection between rotor stages.

Shaft 4 is internally splined as shown at 30 for an axially slidable but non-rotatable driving cooperation with an externally splined compressor extension shaft 32, splines 30 also preventing relative rotation of a compressor tie bolt 33. The rotor wheels and shaft 4 are adapted to be driven by any suitable means, such as a turbine shaft, for example, in the case of the installation of this rotor assembly in a gas turbine engine. As thus far described, therefore, the drive shaft 4 and wheel 20 are rotatably supported from the compressor casing upon the bearing 6.

Mounted on the extended hub 18 between the bearing inner race 16 and the body of wheel 20 for rotation therewith is an annular seal follower 34 having radially and axially extending portions 36 and 38 adapted to cooperate with a shaft seal in a manner to be described. The radial portion 36 of the follower has a seal contact face portion 40 on one side adapted to be engaged by the contact face 42 of a grooved carbon seal ring or annulus 44 mounted in and carried by the radially extending finger portion 46 of an axially slidable sleeve 48 surrounding the axial portion 38 of the seal follower with a running clearance therebetween. The body portion of sleeve 48 is slidably mounted within a radially inner extension portion 50 of a stationary two-piece annular cage 52 having an annular flange 54 secured to the housing 2 by a number of circumferentially spaced bolts 56. An O-ring seal 57 between extension 50 and sleeve 48 prevents the flow of oil from one side of the cage to the other through this connection. The radial finger portion 46 of sleeve 48 is slotted at its periphery at 58, and extension 50 is bored at 60 to provide holes and slots axially aligned with each other for receiving locking pins 62 therein as shown to prevent relative rotation between the sleeve and extension while permitting the sliding axial movement of the sleeve with respect to the extension. Each of the pins is press fitted into the extension 50 with a sliding fit through the slotted sleeve portion 46.

Extension 50 is formed at one side with a radially depending annular flange 64 forming a baffle between the bearing and seal, the flange being apertured at suitable locations 66 for insertion of the pins 62 into the sleeve and extension. At its other side, extension 50 is provided with a number of circumferentially spaced recesses 68 each containing one end of a compression spring 70 surrounding a guide stem 72, the other end engaging the base of a guide plate 74 secured to stem 72 and engageable with sleeve 48, the springs normally biasing sleeve 48 and therefore the contact face 42 of seal annulus 44 to sealingly engage the face portion 40 of the seal follower 34 to substantially prevent leakage of oil through the seal.

Bearing 6 is adapted to be lubricated by oil or other suitable lubricant sprayed into the space 76 adjacent the bearing by an oil jet (not shown). The oil is circulated around the bearing and into the space 78 defined by the bearing, seal follower 34 and cage 52. In an installation of this type, as stated previously, it sometimes occurs that the pressure of the oil mist circulating around inside the cage 52 adjacent the carbon seal annulus 44 becomes higher than the pressure of the uncontaminated air or gas on the other or downstream side of the seal thereby inducing a leakage of oil or oil-laden air from the one side of the seal to the other. Such leakage contaminates the air in the area in front of the initial compressor rotor structure, which is undesirable.

The leakage is eliminated by pressurizing the contact face 42 of the carbon seal annulus with air at a pressure higher than the pressure of the oil or oil mist circulating around the seal from inside the cage 52. This is accomplished by constructing the seal follower in a manner to be described so that it acts both as a centrifugal oil separator to separate the oil particles from the air in the area around the bearing and shaft as well as a centrifugal air pump to suck the cleaned air into the follower and out against the face of the carbon seal annulus with a slight pressure rise.

As shown more clearly in FIGURES 2 and 4, the forward annular locating flange 80 of the seal follower 34 abutting the inner race 16 of the bearing 6 is provided with four radial slots 82 extending therethrough, the slots connecting with a first annulus or bore 84 provided internally of the seal follower, and in turn communicating with a second seal follower annulus 86 of smaller diameter. Annulus 86 in turn connects with four substantially radial air passages 88 drilled in the radial portion of the seal follower and spaced equally around the circumference thereof (FIGURE 2), each of the air passages being connected by an axially drilled passage 90 to the contact face 42 of the carbon ring 44 at the mean radius thereof opposite a continuous groove 92 formed in the face dividing the carbon seal annulus into two portions radially spaced from each other. Under running conditions of the engine with the seal follower rotating at shaft speed, any lubricant oil or oil laden air in the vicinity of the seal follower slots 82 would be acted upon by the rotating slots 82 in the manner of a slinger pump to separate the oil from the air by centrifuging the heavier oil particles outwardly by centrifugal force generated by the rotating follower, the cleaned air being sucked inwardly by the pump to be described. Also, any oil mist laden air that leaks into the annulus 84 through the slots 82 would have the oil particles separated therefrom by the centrifugal force forcing the particles into the corners and outer diameter of the annulus and eventually out through the slots 82, the difference in diameters of annuli 84 and 86 presenting an annular wall therebetween preventing the leakage of the oil particles inwardly. The rotation of the seal follower therefore separates the air from the oil permitting a bleed of the dry air inwardly, and prevents the entry of the oil into the space between the follower and the wheel hub. At the same time, the radial bores 88 in the follower act in the nature of a fluid or air pump due to the differences in diameters of the opposite ends of the bore. Therefore, any air in the bore 88 is acted upon by centrifugal force upon rotation of the follower to be pumped out with a pressure rise into the axial bore 90 and groove 92 in the carbon ring 44 creating a suction in the opposite inlet end 94 of the bore communicating with annulus 86 to draw the clean air separated from the oil in the slots 82 into the annuli 84 and 86 and bore 88. The pressure of this centrifuged air, which initially was at ambient pressure when mixed with the oil in the cage 52 on one side of the seal, then begins to rise and varies as the square of the speed of rotation of the shaft and the radius from the axis of the shaft to the inlet end 94 of the bore and radially outwardly along the bore 88 due to centrifugal force thereon, so that the pressure of the air in the axial passage 90 and at the median point of the carbon seal contact face is higher than the pressure of the oil laden air or oil adjacent the seal. This pressure differential therefore causes a flow of clean pressurized air radially outwardly and inwardly from the median grooved contact face portion 92 of the seal to always prevent the leakage of oil through the seal, the radially inward leakage of air being tolerated since it is not contaminated.

The invention therefore provides a sliding contact shaft seal of the face type having a face pressurized to a higher pressure than that of the surrounding fluid to provide a clean, uncontaminated, leak-proof seal. Therefore, the invention provides a simple and yet effective means for preventing the normal leakage of oil past a seal between the stationary and rotative portions of a compressor or similar rotating assembly.

While the invention is illustrated in its preferred embodiment in FIGURES 1–4, it will be understood by those skilled in the art that many changes may be made thereto without departing from the scope of the invention.

We claim:

1. A fluid separator and seal assembly including a rotatable member, a sleeve surrounding a portion of said member and mounted for a relative rotation therebetween, said member and sleeve together defining a fluid passage therebetween, and seal means in said passage between and engaging said member and said sleeve preventing the flow of fluid therepast, one portion of said seal means being acted upon by fluid at one pressure containing contaminating matter, means on said member acting upon said fluid to separate the contaminating matter therefrom, and pressure increasing means connecting the uncontaminated fluid at a greater pressure than said one pressure to the portion of said seal means engaging said member pressurizing the same to prevent the passage of the contaminated fluid at said one pressure past said seal means.

2. A gas-liquid separator and seal assembly including a rotatable member, a sleeve surrounding a portion of said member and mounted for a relative rotation therebetween, said member and sleeve together defining a fluid passage therebetween, and seal means in said passage between and engaging said member and said sleeve preventing the flow of fluid therepast, one portion of said seal means being acted upon by gas at one pressure containing contaminating liquid matter, means on said member acting upon said gas to centrifuge the contaminating liquid matter therefrom upon rotation of said member, and pressure increasing means connecting the uncontaminated gas at a greater pressure than said one pressure to the member engaging portion of said seal means pressurizing the same to prevent the passage of the contaminated gas at said one pressure past said seal means.

3. A gas-liquid separator and seal assembly including a rotatable member, a sleeve surrounding a portion of said member and mounted for a relative rotation therebetween, said member and sleeve together defining a fluid passage therebetween, and seal means in said passage between and engaging said member and said sleeve preventing the flow of fluid therepast, one portion of said seal means being acted upon by gas at one pressure containing contaminating liquid matter, centrifugal pump means on said member acting upon said gas to centrifuge the contaminating liquid matter therefrom upon rotation of said member, and means including other pump means connecting the uncontaminated gas at a greater pressure than said one pressure to the member engaging portion of said seal means pressurizing the same to prevent the passage of the contaminated gas at said one pressure past said seal means.

4. A gas-liquid separator and seal assembly including a rotatable member, a sleeve surrounding a portion of said member and mounted for a relative rotation therebetween, said member and sleeve together defining a fluid passage therebetween, and seal means in said passage between and engaging said member and said sleeve preventing the flow of fluid therepast, one portion of said seal means being acted upon by gas at one pressure containing contaminating liquid matter, centrifugal pump means on said member acting upon said gas to centrifuge the contaminating liquid matter therefrom upon rotation of said member, and means including other pump means connecting the uncontaminated gas at a greater pressure than said one pressure to the member engaging portion of said seal means pressurizing the same to prevent the passage of the contaminated gas at said one pressure past said seal means, said centrifugal pump means comprising an annular flange having circumferentially spaced slots therethrough adapted to engage the liquid matter-laden gas.

5. A gas-liquid separator and seal assembly including a rotatable member, a sleeve surrounding a portion of said member and mounted for a relative rotation therebetween, said member and sleeve together defining a fluid passage therebetween, and seal means in said passage between and engaging said member and said sleeve preventing the flow of fluid therepast, one portion of said seal means being acted upon by gas at one pressure containing contaminating liquid matter, centrifugal pump means on said member acting upon said gas to centrifuge the contaminating liquid matter therefrom upon rotation of said member, and fluid pressure increasing means connecting the uncontaminated gas at a greater pressure than said one pressure to the member engaging portion of said seal means pressurizing the same to prevent the passage of the contaminated gas at said one pressure past said seal means, said fluid pressure increasing means comprising a substantially radial bore in said member in communication at one end with said member engaging seal means portion and at its other end with the pump means to receive uncontaminated gas therefrom, the rotation of said member subjecting the gas in said bore to the effects of centrifugal force to raise the pressure thereof with an increase in the radial distance from the axis of rotation of said member to pressurize said member engaging seal means portion and to effect flow of said uncontaminated gas into said bore from said pump means.

6. A liquid-gas separator and seal assembly including a hollow rotatable shaft, a sleeve surrounding a portion of said shaft and mounted for a relative rotation therebetween, said shaft and sleeve together defining a passage therebetween for the flow of gas therethrough, and seal means between said shaft and said sleeve in said passage preventing the flow of gas therepast, said shaft having centrifugal pump means thereon, the gas in said passage at one end being at one pressure and containing contaminating liquid matter and communicating with said pump means, said shaft having a radially extending gas bore therein having one end in communication with a portion of said seal means and the other end in communication with said pump means, rotation of said shaft subjecting the liquid matter-laden gas to the effect of centrifugal force separating the liquid matter from the gas, the uncontaminated gas passing into said bore to increase its pressure with an increase in the radial distance along the bore from the shaft axis such that the gas pressure at said portion of said seal means is greater than the said one pressure creating a pressure differential therebetween to prevent flow of contaminated gas at said one pressure past said seal means.

7. A gas-liquid separator and seal assembly including a rotatable member, a sleeve surrounding a portion of said member and mounted for a relative rotation therebetween, said member and sleeve together defining a fluid passage therebetween, and seal means in said passage between and engaging said member and said sleeve preventing the flow of fluid therepast one portion of said seal means being acted upon by gas at one pressure containing contaminating liquid matter centrifugal pump means on said member acting upon said gas to centrifuge the contaminating liquid matter therefrom upon rotation of said shaft and means including other pump means connecting the uncontaminated gas at a greater pressure than said one pressure to the member engaging portion of said seal means pressurizing the same to prevent the passage of the contaminated gas at said one pressure past said seal means said centrifugal pump means comprising an annular flange having circumferentially spaced slots therethrough adapted to engage the liquid matter-laden gas said other pump means comprising a substantially radial bore in said member in communication at one end with said member engaging seal means portion and at its other end with the centrifugal pump means to receive uncontaminated gas therefrom the rotation of said member subjecting the gas in said bore to the effects of centrifugal force to raise the pressure thereof with an increase in the radial distance from the axis of rotation of said member to pressurize said member engaging seal means portion and to effect flow of said uncontaminated gas into said bore from said other pump means.

References Cited in the file of this patent
UNITED STATES PATENTS

| | | |
|---|---|---|
| 2,835,514 | McGahan | May 20, 1958 |
| 2,857,182 | Bain et al. | Oct. 21, 1958 |
| 2,907,594 | Macks | Oct. 6, 1959 |

UNITED STATES PATENT OFFICE
CERTIFICATE OF CORRECTION

Patent No. 3,081,097                                March 12, 1963

James R. Dison et al.

It is hereby certified that error appears in the above numbered patent requiring correction and that the said Letters Patent should read as corrected below.

Column 3, line 7, for "The" read -- This --; column 6, line 19, after "therepast" insert a comma; line 21, after "matter" insert a comma; line 24, after "shaft" insert a comma; line 29, after "means", first occurrence, insert a comma; line 32, after "gas" insert a comma; line 36, after "therefrom" insert a comma.

Signed and sealed this 22nd day of October 1963.

(SEAL)
Attest:

ERNEST W. SWIDER                          EDWIN L. REYNOLDS

Attesting Officer                           Acting Commissioner of Patents